United States Patent
Neul et al.

(10) Patent No.: US 9,164,123 B2
(45) Date of Patent: Oct. 20, 2015

(54) MICROMECHANICAL ROTARY ACCELERATION SENSOR AND METHOD FOR DETECTING A ROTARY ACCELERATION

(75) Inventors: Reinhard Neul, Stuttgart (DE); Torsten Ohms, Vaihingen/Enz-Aurich (DE); Mirko Hattass, Stuttgart (DE); Daniel Christoph Meisel, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 341 days.

(21) Appl. No.: 13/453,425

(22) Filed: Apr. 23, 2012

(65) Prior Publication Data

US 2012/0272735 A1  Nov. 1, 2012

(30) Foreign Application Priority Data

Apr. 27, 2011  (DE) .......................... 10 2011 017 603

(51) Int. Cl.
  *G01P 15/00*  (2006.01)
  *G01P 15/097*  (2006.01)

(52) U.S. Cl.
  CPC .................................. *G01P 15/097* (2013.01)

(58) Field of Classification Search
  USPC ..................................................... 73/514.02
  See application file for complete search history.

(56) References Cited

U.S. PATENT DOCUMENTS

| | | | | |
|---|---|---|---|---|
| 5,349,858 A | * | 9/1994 | Yagi et al. | 73/514.02 |
| 5,441,300 A | * | 8/1995 | Yokota et al. | 280/735 |
| 6,308,568 B1 | * | 10/2001 | Moriya | 73/504.13 |
| 6,508,124 B1 | * | 1/2003 | Zerbini et al. | 73/514.32 |
| 6,520,017 B1 | * | 2/2003 | Schoefthaler et al. | 73/514.02 |
| 6,691,571 B2 | * | 2/2004 | Willig et al. | 73/504.12 |
| 7,421,898 B2 | * | 9/2008 | Acar et al. | 73/504.12 |

FOREIGN PATENT DOCUMENTS

| | | |
|---|---|---|
| DE | 199 38 206 A1 | 2/2001 |
| EP | 1 083 144 A1 | 3/2001 |

OTHER PUBLICATIONS

Kang et al., Surface Micromachined Multi-Layer Moving Gate Field Effect Transistor (MOGFET) Pressure Switch with Integrated Vacuum Sealed Cavity, Twelfth IEEE International Conference on Micro Electro Mechanical Systems, pp. 499-504 (1999).

* cited by examiner

*Primary Examiner* — Hezron E Williams
*Assistant Examiner* — Mark A Shabman
(74) *Attorney, Agent, or Firm* — Maginot, Moore & Beck LLP

(57) ABSTRACT

The disclosure relates to a micromechanical rotary acceleration sensor including a substrate with at least one anchoring device and at least two flywheel masses. At least one of the flywheel masses is connected to at least one anchoring device by means of a coupling element. The at least one anchoring device is designed in such a manner that the at least two flywheel masses are elastically deflectable from a respective rest position about at least one axis of rotation. The at least two flywheel masses is designed in such a manner that they have different natural frequencies.

19 Claims, 5 Drawing Sheets

MICROMECHANICAL ROTARY ACCELERATION SENSOR AND METHOD FOR DETECTING A ROTARY ACCELERATION

This application claims priority under 35 U.S.C. §119 to German patent application no. 10 2011 017 603.9, filed on Apr. 27, 2011 in Germany, the disclosure of which is incorporated herein by reference in its entirety.

BACKGROUND

The present disclosure relates to a micromechanical rotary acceleration sensor, to a method for detecting a rotary acceleration and to a use of a rotary acceleration sensor.

Rotary acceleration sensors are used to measure rotary accelerations, inter alia in the motor vehicle sector. For example, a so-called bend or cornering light can be implemented using a rotary acceleration sensor. The rotary acceleration sensor measures the rotary acceleration of the vehicle when driving around a bend and forwards a corresponding signal to a control device which pivots headlights of the motor vehicle, for example using a motor, on the basis of the rotary acceleration. The bend is illuminated better as a result of the headlights being pivoted according to the bend traveled through.

Already known micromechanical rotary acceleration sensors have been disclosed, for example, in DE 199 38 206 A1 and EP 1 083 144 A1.

SUMMARY

A micromechanical rotary acceleration sensor comprises a substrate with at least one anchoring device, and at least two flywheel masses, at least one of the flywheel masses being connected to at least one anchoring device by means of a first coupling element, and the at least one anchoring device being designed in such a manner that the at least two flywheel masses are elastically deflectable from a respective rest position about at least one axis of rotation, and the at least two flywheel masses being designed in such a manner that they have different natural frequencies, in particular with respect to a rotary acceleration.

A method for detecting a rotary acceleration, comprises the steps of first deflection of a first flywheel mass from a rest position on the basis of a rotary acceleration with a first deflection, second deflection of a second flywheel mass from a rest position on the basis of the rotary acceleration with a second deflection, the first and second deflection operations being elastically carried out, and the first and second flywheel masses being designed in such a manner that they have different natural frequencies.

The disclosure includes a use of a rotary acceleration sensor for detecting rotary acceleration, in particular in motor vehicles, aircraft, mobile devices or the like.

A micromechanical rotary acceleration sensor according to the disclosure has a cross-sectional area of less than 5 mm$^2$, in particular less than 2.5 mm$^2$, preferably less than 1 mm$^2$ Natural frequencies of the flywheel masses are substantially between 0 Hz and 1 MHz, in particular between 100 Hz and 100 kHz, preferably between 10 kHz and 100 kHz.

One of the advantages, as described herein, is that the performance is thereby considerably increased in comparison with previously known micromechanical rotary acceleration sensors. Another advantage is that the micromechanical rotary acceleration sensor can sense rotary accelerations over a broader range of constant sensitivity.

The underlying idea of the present disclosure is thus to provide a micromechanical rotary acceleration sensor having at least two flywheel masses each having different natural frequencies, with the result that the sensor is sensitive to different rotary accelerations in different frequency ranges and a broader range of constant sensitivity thus results for measuring rotary accelerations.

Further advantageous developments of the disclosure are described herein.

According to one advantageous development, the two flywheel masses have a rectangular cross section perpendicular to the at least one axis of rotation. The advantage achieved in this case is that different natural frequencies can thus be provided for the flywheel masses in a simple and reliable manner and, in particular, the rotation sensor can also be compact at the same time. In addition, a rectangular cross section can also be produced in a simpler manner since chips, for example, are singulated along rectangular or straight cutting edges. Other shapes are also conceivable, preferably entirely or partially symmetrical shapes for the cross section, comprising a circular, an elliptical or a rectangular cross section, the latter with rounded corners, or combinations thereof.

According to another advantageous development, the at least two flywheel masses are elastically deflectable and rotatable about a common axis of rotation. The advantage achieved thereby is that the rotary acceleration sensor can thus be even more compact in terms of its physical size. At the same time, it is also possible to evaluate signals from the rotary acceleration sensor in a simpler manner since it is possible to dispense with different signals on account of different axes of rotation and the thus more complicated consideration of these different signals during evaluation.

According to another advantageous development, the at least two flywheel masses are arranged coaxially with respect to the common axis of rotation. This enables an even more compact physical size of the rotary acceleration sensor with simultaneously sufficient accuracy for detecting rotary accelerations. According to another advantageous development, at least one of the flywheel masses is connected to the at least one other flywheel mass by means of a second coupling element. The advantage achieved thereby is that the flywheel masses are thus connected to the substrate via a central anchoring device and additional space is thus provided on the substrate, for example for arranging conductor tracks and the like.

According to another advantageous development, at least one detection means, in particular in the form of an electrode, is arranged in order to detect a deflection of the flywheel masses. This makes it possible to determine the rotary acceleration of the acceleration acting on the rotary acceleration sensor in a simple and reliable manner using the deflection. In this case, the detection means can be arranged to the side of, above and/or below the respective flywheel mass in order to detect a deflection of the respective flywheel masses in at least one spatial direction, preferably in a plane, in particular in all three spatial directions.

According to another advantageous development, the at least one detection means comprises an optical, piezoresistive, piezoelectric, capacitive, magnetic and/or moving-gate means. The advantage achieved thereby is that the micromechanical rotary acceleration sensor can thus be adapted in a simple manner to different applications in different environments. Different detection means for different flywheel masses may thus be arranged according to the application, for example with regard to installation space and/or desired accuracy. Moving-gate means comprise, for example, so-called MOG-FETs, inter alia disclosed in IEEE 99, page 499-page 504 "Surface micromachined Multilayer Moving Gate Field Effect Transistor Pressure Switch with Integrated Vacuum Sealed Cavity". These may be arranged, for example, in such a manner that a deflection of a flywheel mass is accordingly modeled by an increased external pressure. The restoring force of a second layer of the MOG-FET and an electrical force between the second layer and a moving-gate plate are dependent in this case on the distance between the second layer and the moving-gate plate.

BRIEF DESCRIPTION OF THE DRAWINGS

Further features and advantages of the disclosure emerge from the following description of exemplary embodiments using the drawing, in which.

DETAILED DESCRIPTION

In the figures, identical reference symbols denote identical or functionally identical elements, unless otherwise described.

Figure 1:
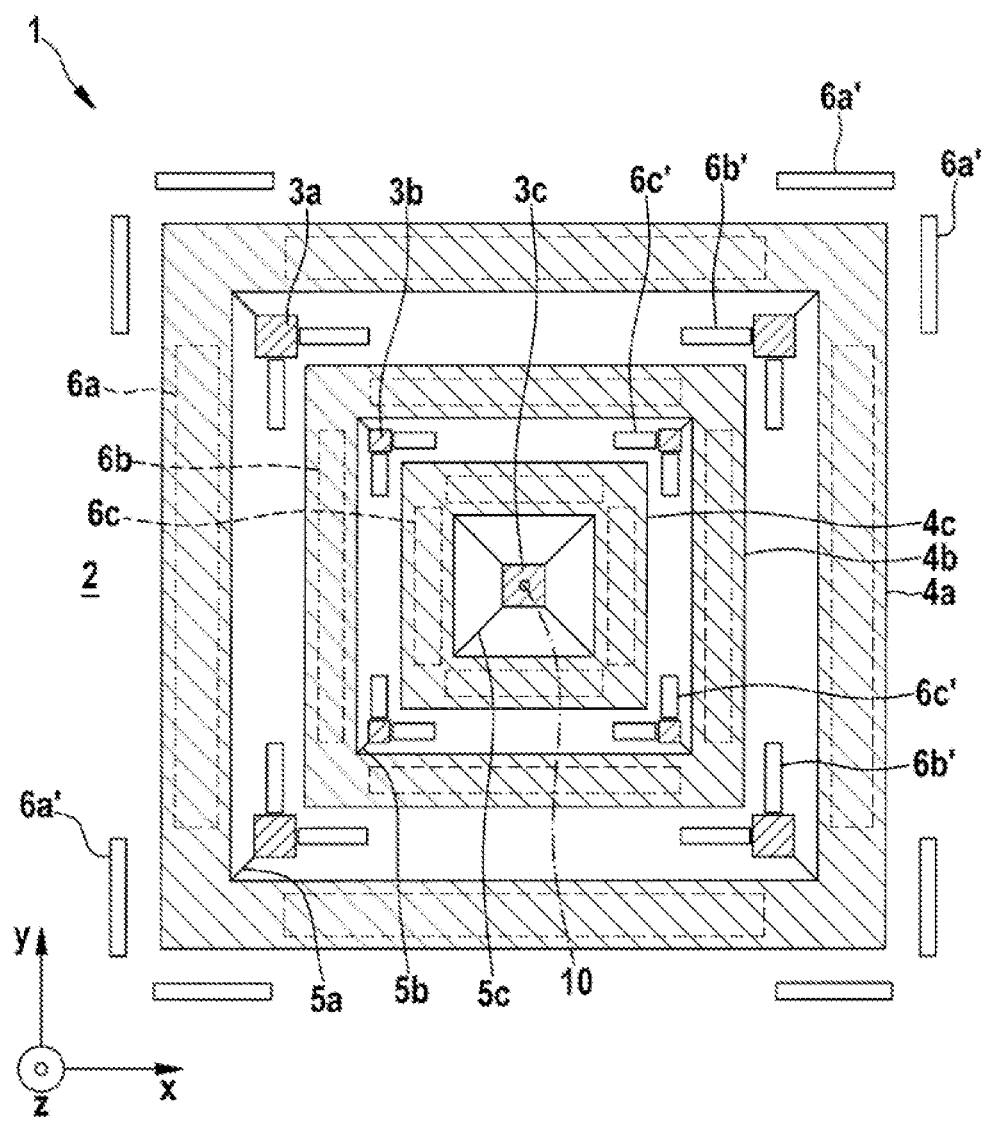
FIG. 1 schematically shows a plan view of a three-axis micromechanical rotary acceleration sensor according to a first embodiment of the present disclosure.

FIG. 1 shows a plan view of a three-axis micromechanical rotary acceleration sensor according to a first embodiment of the present disclosure in cross section.

Figure 5:
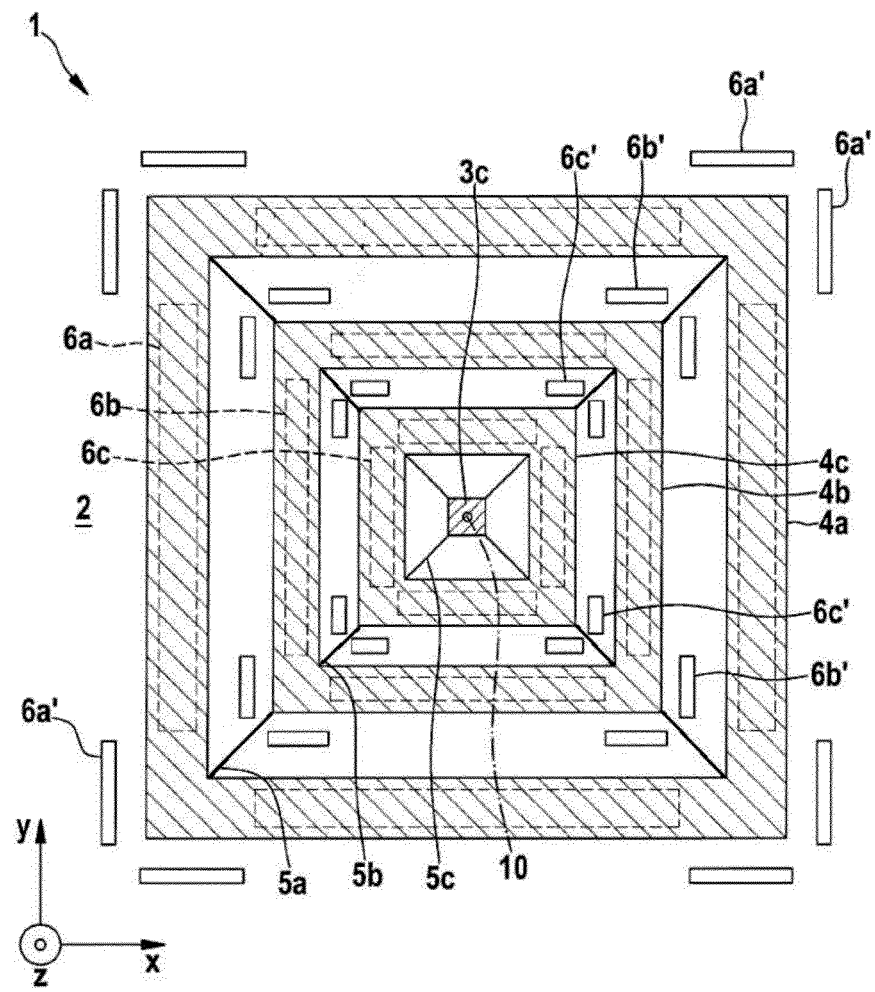
FIG. 5 schematically shows a plan view of a three-axis micromechanical rotary acceleration sensor according to another embodiment of the present disclosure.

In FIG. 1, reference symbol 1 denotes a micromechanical three-axis rotary acceleration sensor. In this case, the rotary acceleration sensor 1 comprises, in the x-y plane which forms the plane of the drawing in FIG. 1 and also in FIG. 2, a substrate 2 on which an anchoring device 3c is arranged. Furthermore, three flywheel masses 4a, 4b, 4c are formed coaxially and/or concentrically with respect to the anchoring device 3c in the form of interleaved rectangular frames, with the result that the anchoring device 3c is in the form of a central anchoring device. The innermost rectangular frame 4c is connected to the anchoring device 3c via four bending beams 5c which extend from the respective inner corners of the innermost frame 4c to the anchoring device 3c. The further flywheel masses 4a, 4b in the form of frames are connected to four respective anchoring devices 3a, 3b, which are arranged on the substrate 2, via four respective bending beams 5a, 5b which are arranged at the four inner corners of the respective flywheel mass 4a, 4b. In addition, instead of respectively connecting the four bending beams 5a, 5b to anchoring devices 3a, 3b, it is possible to connect them to the respective inner flywheel mass 4b, 4c, as shown in FIG. 5, with the result that the flywheel masses 4a, 4b are centrally connected to the anchoring device 3c indirectly and the flywheel mass 4c is centrally connected to the anchoring device 3c directly.

In order to detect the rotary movement of the respective flywheel masses 4a, 4b, 4c, two electrodes 6a', 6b', 6c' are respectively arranged on the outside of the flywheel masses 4a, 4b, 4c in the form of frames in the region of the edges and interact with a respective electrode 6a, 6b, 6c, in particular a centrally arranged electrode, for each side of the respective flywheel mass 4a, 4b, 4c. Overall, one electrode for each side, and thus a total of four electrodes 6a, 6b, 6c, are thus respectively arranged in or on the respective frame or the respective flywheel mass 4a, 4b, 4c. As already stated above, two electrodes are arranged on each side, that is to say a total of eight electrodes 6a', 6b', 6c' in each case, on the respective outer side of the flywheel masses 4a, 4b, 4c. In this case, the electrodes 6a, 6b, 6c, 6a', 6b', 6c' are arranged in such a manner that they are used both to evaluate the rotary movement in the x-y plane, that is to say the axis of rotation is thus oriented parallel to the z-axis, and to evaluate a movement of the respective frame along the z-direction. The axis of rotation is thus oriented parallel to the x-axis or y-axis. Overall, a three-dimensional deflection of the respective flywheel mass 4a, 4b, 4c can thus be detected.

Figure 2:
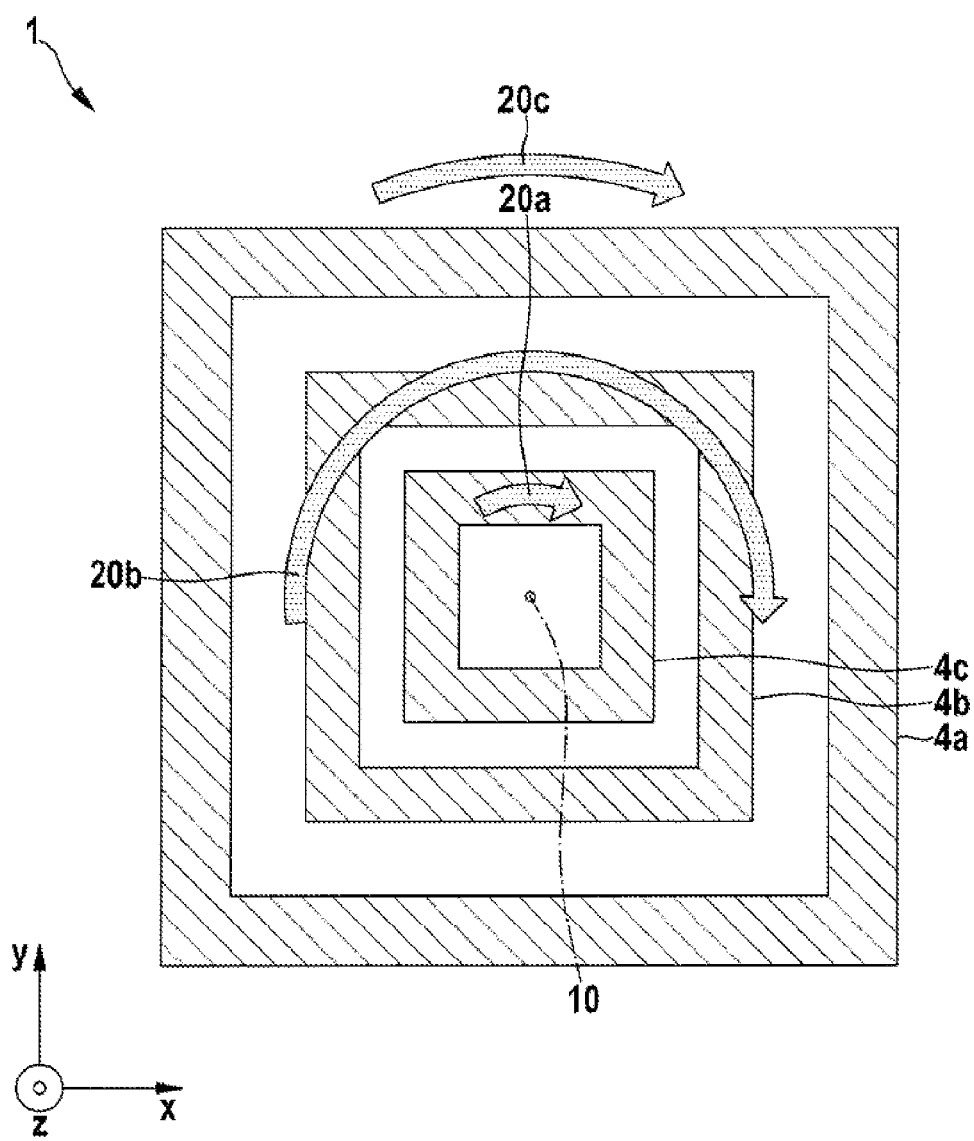
FIG. 2 schematically shows the micromechanical rotary acceleration sensor according to FIG. 1 with different deflections on account of an acceleration.

FIG. 2 shows the micromechanical rotary acceleration sensor according to FIG. 1 with different deflections on account of an acceleration.

FIG. 2 shows a simplified illustration of the rotary acceleration sensor 1 in FIG. 1. In FIG. 2, it is possible to see the interleaved flywheel masses 4a, 4b, 4c which are in the form of frames and are arranged concentrically with respect to an axis of rotation 10 which is oriented perpendicular to the x-y plane. If a rotary acceleration now acts on the rotary acceleration sensor 1, for example perpendicular to the x-y plane, the flywheel masses 4a, 4b, 4c are deflected to different extents since the natural frequency of the respective flywheel mass 4a, 4b, 4c is different. In FIG. 2, the inner flywheel mass 4c is thus deflected by a small angle 20a, illustrated as a corresponding arrow in FIG. 2, whereas the flywheel mass 4b is deflected to a considerably greater extent by a larger angle 20b, symbolized by a longer arrow in FIG. 2. The outer flywheel mass 4c is deflected by an angle 20c, likewise illustrated using an arrow. If a rotary acceleration with a particular excitation frequency acts on the rotary acceleration sensor 1, that flywheel mass 4a, 4b, 4c whose natural frequency is closest to the excitation frequency of the rotary acceleration is deflected to the greatest extent.

FIG. 3 shows transfer functions and an overall transfer function of a micromechanical rotary acceleration sensor according to FIG. 1.

Figure 3B:
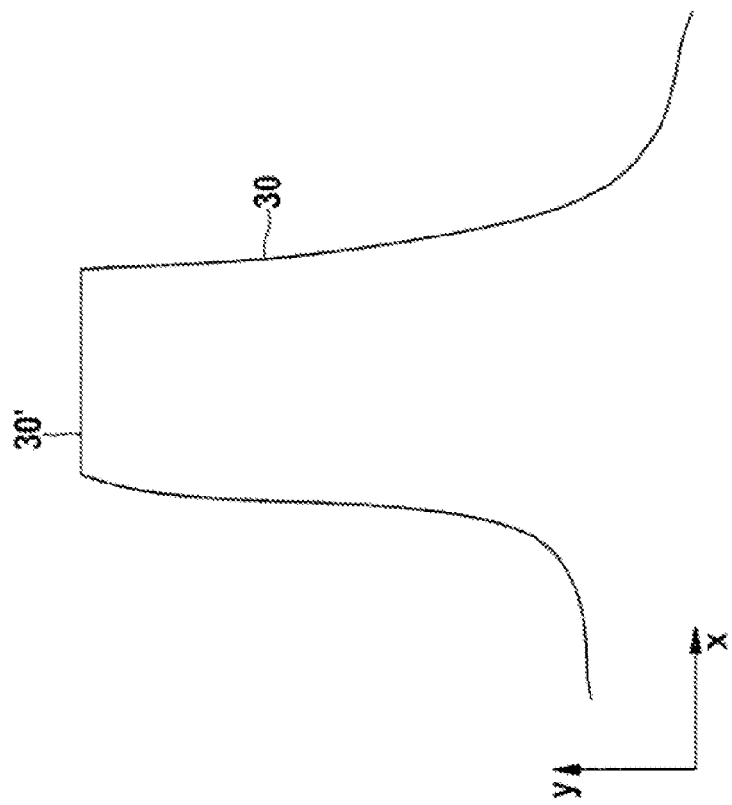
FIGS. 3a, b schematically show individual transfer functions and an overall transfer function of a micromechanical rotary acceleration sensor according to FIG. 1.
Figure 3A:
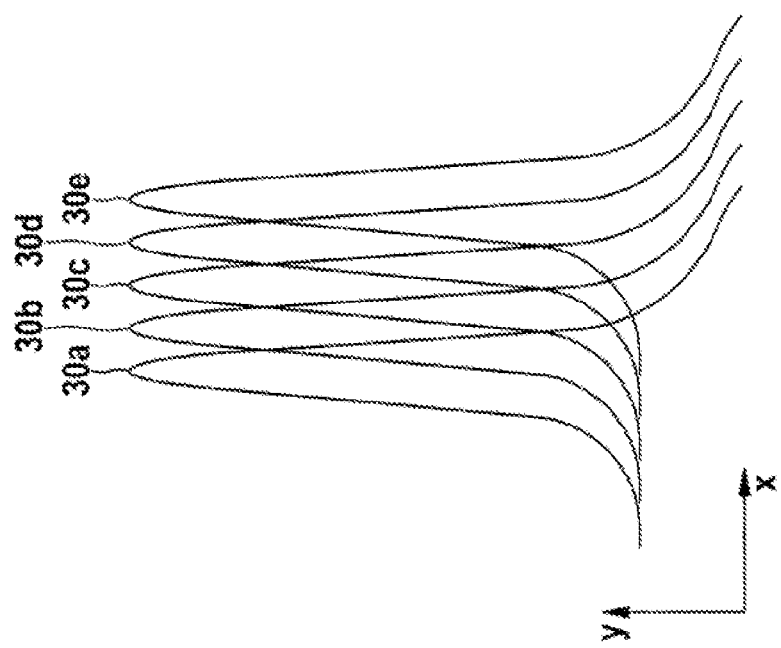

In FIG. 3a, reference symbols 30a to 30e each denote individual deflection/frequency relationships of five different flywheel masses. Any desired linear frequency scale is plotted on the horizontal axis and any desired linear deflection scale is plotted on the y-axis. The respective continuous transfer functions 30a to 30e run toward substantially constant values at low frequencies, have a maximum at a resonant frequency and fall toward zero at higher frequencies. In this case, the respective maxima of the transfer functions 30a to 30e are each shifted with respect to one another but have the same or at least a similar value for the maximum deflection in each case. The respective maxima indicate the respective natural frequency of the respective flywheel mass. If the individual transfer functions 30a to 30e are now superimposed, as shown in FIG. 3b, the result is an overall transfer function 30 in which a broad range with constant sensitivity is formed. The overall transfer function according to FIG. 3b substantially corresponds to the sum of the individual transfer functions 30a-30e. Although it is no longer possible to determine the exact rotary acceleration as a result of the sum formation since it is no longer possible to distinguish which of the natural frequencies of the transfer functions 30a-30e is closest to an excitation frequency, it is possible to reliably detect a rotary acceleration via the plateau range of the overall transfer functions which is shown in FIG. 3b: the effective total transfer function 30 in FIG. 3b increases substantially according to the transfer function 30a, but remains constant for a certain frequency range, the so-called plateau range 30', and then falls to 0 again according to an individual transfer function, here 30e. This makes it possible to accurately determine whether or not there is a rotary acceleration in the plateau range 30'.

Figure 4:
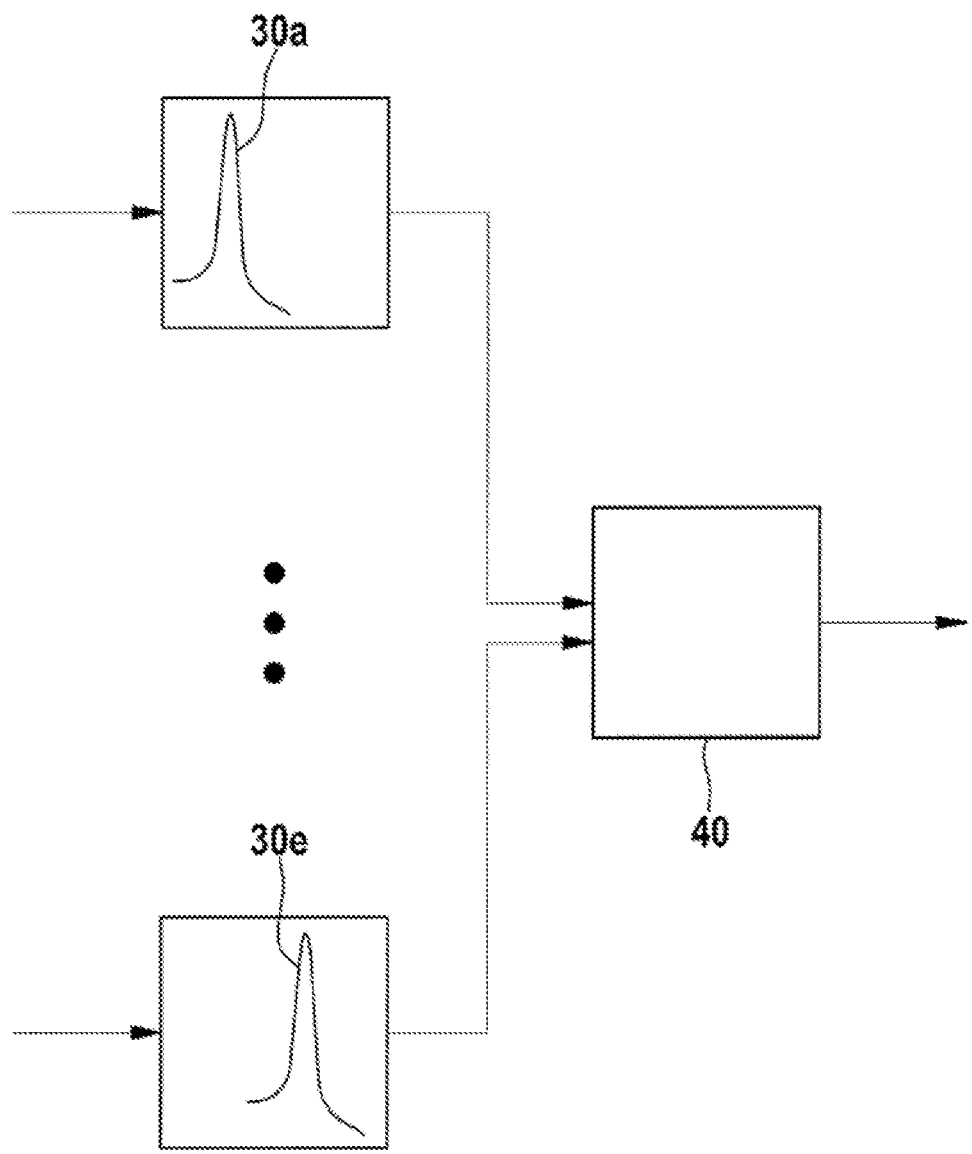
FIG. 4 schematically shows a block diagram for the signal processing of a rotary acceleration sensor according to FIG. 1.

FIG. 4 shows a block diagram for the signal processing of a rotary acceleration sensor according to FIG. 1.

FIG. 4 shows a block diagram for signal processing of the individual transfer functions 30a-30e. Respective flywheel masses each record individual signals 30a to 30e which form the respective transfer functions. These transfer functions may be provided, for example, in the form of capacitance changes, resistance changes or the like, depending on the respective detection means. For example, the respective rotary acceleration can then be determined in a particular region on the rotary acceleration sensor with a desired degree of accuracy by forming the sum and/or product of the individual transfer functions 30a-30e using an evaluation circuit 40.

Although the present disclosure was described above using preferred exemplary embodiments, it is not restricted thereto but can be modified in various ways.

Rotary acceleration sensors 1 can thus be used, for example, in the automotive sector for roll-over sensing (ROSE) or in consumer electronics in the area of the human-machine interface.

What is claimed is:

1. A micromechanical rotary acceleration sensor, comprising:
a substrate with at least one anchoring device; and
at least three flywheel masses, at least one of the flywheel masses being connected to at least one anchoring device by means of a first coupling element,
wherein the at least one anchoring device is designed in such a manner that the at least three flywheel masses are elastically deflectable and rotatable from a respective rest position about at least one axis of rotation, and
wherein the at least three flywheel masses are designed in such a manner that they have different rotational natural frequencies.

2. The rotary acceleration sensor according to claim 1, wherein the at least three flywheel masses have a rectangular cross section perpendicular to at least one axis of rotation.

3. The rotary acceleration sensor according to claim 1, wherein the at least three flywheel masses are elastically deflectable and rotatable about a common axis of rotation.

4. The rotary acceleration sensor according to claim 1, wherein the at least three flywheel masses are arranged coaxially with respect to the common axis of rotation.

5. The rotary acceleration sensor according to claim 1, wherein a first of the flywheel masses is connected to a second of the flywheel masses via a second coupling element.

6. The rotary acceleration sensor according to claim 5, wherein:
the first coupling element is a first bending beam; and
the second coupling element is a second bending beam.

7. The rotary acceleration sensor according to claim 5, wherein a third of the flywheel masses is connected to the second of the flywheel masses via a third coupling element.

8. The rotary acceleration sensor according to claim 1, wherein at least one detection means, in particular in the form of an electrode, is arranged in order to detect a deflection of the flywheel masses.

9. The rotary acceleration sensor according to claim 8, wherein the detection means includes optical, piezoresistive, piezoelectric, capacitive, magnetic and/or moving-gate means.

10. The rotary acceleration sensor according to claim 1, wherein the rotary acceleration sensor is used for detecting rotary accelerations, in particular in motor vehicles, aircraft, mobile devices or the like.

11. The rotary acceleration sensor according to claim 1, further comprising:
at least one further anchoring device,
wherein another of the at least three flywheel masses is connected to at least one further anchoring device by means of a second coupling element.

12. The rotary acceleration sensor according to claim 11, wherein:
the first coupling element is a first bending beam; and
the second coupling element is a second bending beam.

13. The rotary acceleration sensor according to claim 1, wherein:
the first coupling element is a first bending beam.

14. A micromechanical rotary acceleration sensor, comprising:
a substrate with at least one anchoring device; and
at least two flywheel masses, at least one of the flywheel masses being connected to at least one central anchoring device by means of a first coupling element, the at least one central anchoring device being positioned central to the at least two flywheel masses,
wherein the at least one anchoring device is designed in such a manner that the at least two flywheel masses are elastically deflectable and rotatable from a respective rest position about at least one axis of rotation, and
wherein the at least two flywheel masses are designed in such a manner that they have different rotational natural frequencies.

15. The micromechanical rotary acceleration sensor of claim 14, wherein the at least two flywheel masses are elastically deflectable and rotatable about a common axis of rotation.

16. The micromechanical rotary acceleration sensor of claim 14, wherein the at least two flywheel masses are arranged coaxially with respect to the common axis of rotation.

17. The micromechanical rotary acceleration sensor of claim 14, wherein at least one of the flywheel masses is connected to the at least one other flywheel mass by means of a second coupling element.

18. A micromechanical rotary acceleration sensor, comprising:
a substrate with at least one anchoring device;
at least two flywheel masses, at least one of the flywheel masses being connected to at least one anchoring device by means of a first coupling element; and
at least one detection device configured to detect a deflection of at least one of the flywheel masses in at least two spatial directions,
wherein the at least one anchoring device is designed in such a manner that the at least two flywheel masses are elastically deflectable and rotatable from a respective rest position about at least one axis of rotation, and wherein the at least two flywheel masses are designed in such a manner that they have different rotational natural frequencies.

19. The micromechanical rotary acceleration sensor of claim 18, wherein the at least one detection device is configured to detect a deflection of at least one of the flywheel masses in at least three spatial directions.

* * * * *